W. M. MYERS.
AUTOMATIC PUMPING MACHINE.
APPLICATION FILED SEPT. 23, 1909.
963,058.
Patented July 5, 1910.
2 SHEETS—SHEET 1.
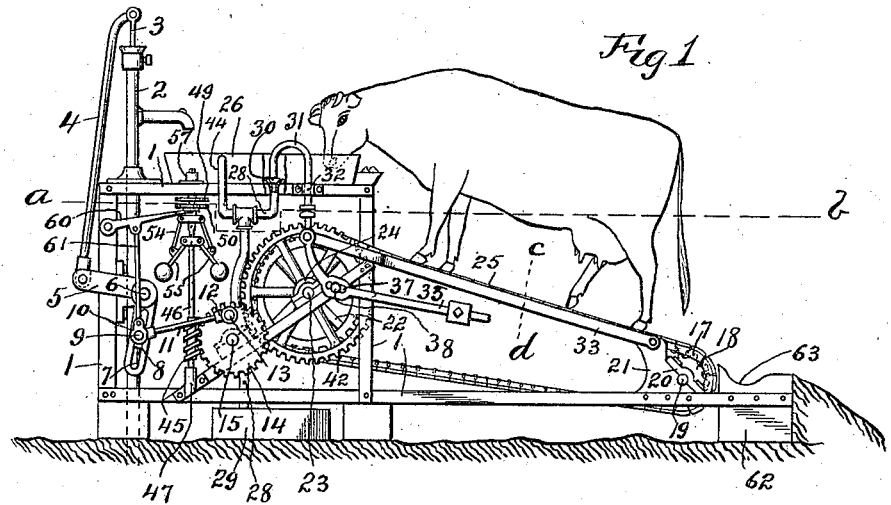
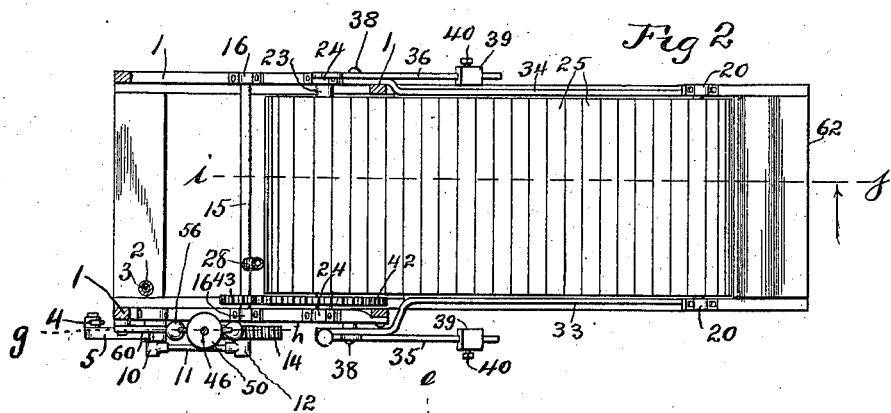
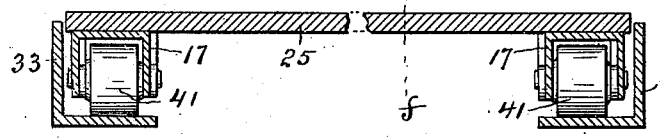
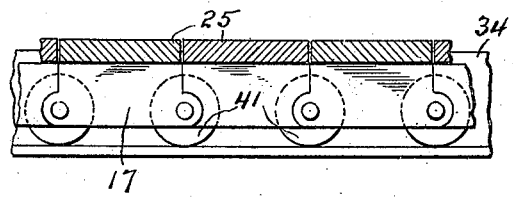
WITNESSES:
R. E. Hamilton
H. W. House
INVENTOR.
William M. Myers
BY
Warren D. House,
His ATTORNEY.

W. M. MYERS.
AUTOMATIC PUMPING MACHINE.
APPLICATION FILED SEPT. 23, 1909.
963,058.
Patented July 5, 1910.
2 SHEETS—SHEET 2.
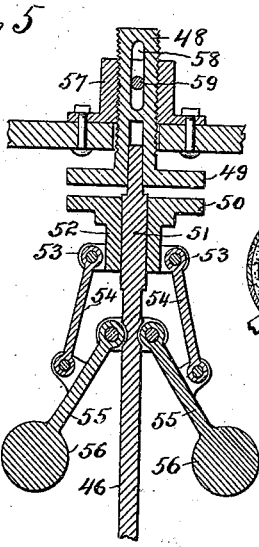
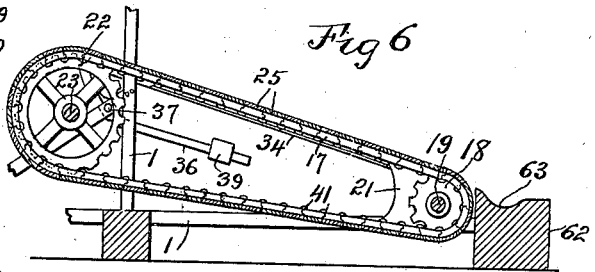
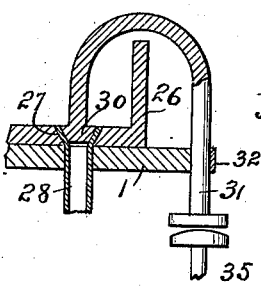
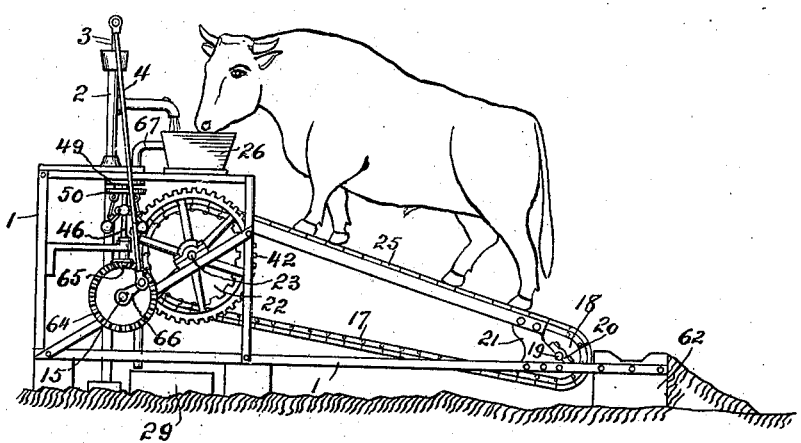
WITNESSES:
R E Hamilton
H. W. House
INVENTOR.
William M. Myers
BY
Warren D. House
His ATTORNEY.

UNITED STATES PATENT OFFICE.

WILLIAM M. MYERS, OF KANSAS CITY, MISSOURI.

AUTOMATIC PUMPING-MACHINE.

963,058.  Specification of Letters Patent.  Patented July 5, 1910.

Application filed September 23, 1909. Serial No. 519,232.

*To all whom it may concern:*

Be it known that I, WILLIAM M. MYERS, a citizen of the United States, residing at Kansas City, in the county of Jackson and State of Missouri, have invented certain new and useful Improvements in Automatic Pumping-Machines, of which the following is a specification.

My invention relates to improvements in automatic pumping machines.

The object of my invention is to provide a pumping machine which is operated by the weight of an animal, and is provided with means by which the amount of water pumped is proportionate to the weight of the animal operating the machine.

A further object of my invention is to provide a water trough having a discharge opening and a valve controlling said opening combined with means actuated by the weight of an animal which comes to drink at the trough for closing the valve, the valve being automatically opened on the departure of the animal so as to permit the discharge of water from the trough that may still remain in the trough, thereby assuring fresh water for each animal.

Other novel features of my invention are hereinafter fully described and claimed.

In the accompanying drawings illustrative of my invention, Figure 1 is a side elevation of the preferred form of my invention, an animal being shown standing on the treadmill. Fig. 2 is a horizontal section on the dotted line *a—b* of Fig. 1. Fig. 3 is a cross section, enlarged, taken on the dotted line *c—d* of Fig. 1. Fig. 4 is a cross section on the dotted line *e—f* of Fig. 3. Fig. 5 is a vertical sectional view, enlarged, on the dotted line *g—h* of Fig. 2. Fig. 6 is a vertical sectional view on the dotted line *i—j* of Fig. 2. Fig. 7 is a vertical sectional enlarged view of the valve and parts connected therewith. Fig. 8 is a side elevation of a modified form of my invention.

Similar reference characters denote similar parts.

In the preferred form of my invention shown in Figs. 1 to 7 inclusive a frame 1 of any suitable form is provided. Supported on the frame 1 is a pump 2, preferably having a vertical reciprocative plunger 3 connected by a rod 4 to one arm of a bell crank lever 5 which is pivoted at its angle to the frame 1 by a horizontal bolt 6. The other arm of the lever 5 is provided with a slot 7 disposed radially to the bolt or pivot 6 and which has slidably mounted in it a block 8 provided with a lateral cylindrical projection 9 on which is pivoted a box 10, which is connected by a rod 11 to a box 12 rotatively mounted on a horizontal pin 13 secured eccentrically on a worm wheel 14 which in turn is secured rigidly on a horizontal shaft 15 rotatively mounted in boxes 16 supported on the frame 1. Means operative by the weight of an animal are provided for rotating the shaft 15. When the shaft is rotated the plunger 3 of the pump will be reciprocated by means of the rod 4, lever 5, block 8, rod 11, boxes 10 and 12, pin 13 and worm wheel 14.

Preferably a treadmill is provided to rotate the shaft 15. The treadmill preferably employed comprises the following described parts: 17 denotes two endless chain belts mounted respectively on two sprocket wheels 18 secured on a horizontal shaft 19 rotative in boxes 20 secured respectively on two blocks 21 which are supported on the frame 1. The chain belts 17 are also respectively mounted on two sprocket wheels 22 secured rigidly on a horizontal shaft 23 rotative in boxes 24 on the frame 1. Horizontal cleats or strips 25 are secured on the chain belts 17 for supporting the animals which come to drink from a trough 26 mounted on the frame 1 in position to receive water from the pump 2. In the bottom of the trough 26 is a discharge opening 27 in which is secured the upper end of a conductor 28, the lower end of which discharges into another trough 29 disposed below the trough 26. In the upper end of the conductor 28 is adapted to rest a valve 30, preferably movable by gravity to the closed position and having an inverted U shaped stem 31 which passes over the side of the trough 26 and has its outer vertical arm slidably mounted in a box 32 secured to the frame 1.

To raise the valve 30 the following mechanism is preferably provided:—Two angle bars 33 and 34 are respectively pivoted at their lower ends to the blocks 21. The upper ends of the angle bars 33 and 34 are pivoted respectively to the upper ends of two levers 35 and 36 which are provided with slots 37 in which are mounted pivot pins 38 secured horizontally to the frame 1. On the levers 35 and 36 are respectively mounted two slidable weights 39 provided with set screws 40 for securing the weights in the positions to which they may be adjusted. The chain belts 17 are provided with rollers 41 which are adapted to travel on the adjacent angle bars or levers 33 and 34, when the weight of an animal is resting on the cleats 25 and depresses thereby the chains 17, and the bars 33 and 34. The upper end of the lever 35 is adapted to strike the valve stem 31 and thereby raise the valve 30 when the weight of an animal is not resting on the cleats 25. The weights 39 cause the levers 35 and 36 to swing upwardly the bars 33 and 34 when no animal is on the treadmill.

Secured on the shaft 23 of the treadmill is a spur gear wheel 42 which meshes with a pinion 43 secured on the shaft 15.

To carry off overflow from the trough 26, the lower end of a pipe 44 is connected to the conductor 28, its upper end being extended through one side of the trough 26 near the upper edge thereof.

To control the amount of water supplied by the pump 2 the following described mechanism is preferred: The worm wheel 14 meshes with a worm 45 on a vertical shaft 46, the lower end of which is rotative in a box 47 on the frame 1, and the upper end of which is rotative in a vertical box 48 provided at its lower end with a horizontal friction disk portion 49 against which is adapted to bear the upper side of a friction disk 50 having a central square vertical hole in which is slidably fitted a square portion 51 of the shaft 46. The shank 52 of the friction disk 50 is provided with two pairs of diametrically opposite ears 53 to which are respectively pivoted the upper ends of two rods 54 the lower ends of which are respectively pivoted to two swinging governor arms 55, which are pivoted at their upper ends to opposite sides of the shaft 46 and at their lower ends are provided each with a ball 56.

The box 48 is preferably vertically adjustable so as to vary the distance the disk 50 will rise before it strikes the disk portion 49. Preferably the box is cylindrical and screw threaded, the threaded portion being fitted in an internally threaded collar 57 supported on the frame 1. To lock the box 48 in the position in which it is adjusted it is provided with a vertical slot 58 adapted to receive therein a horizontal removable locking pin 59 mounted in a horizontal hole in the collar 57.

A lever 60 is pivoted at one end to the frame 1 and has its other bifurcated end embracing the shank 52 of the friction disk 50 above the ears 53. Intermediate the ends of the lever 60 is pivoted thereto the upper end of a vertical rod 61 the lower end of which is pivoted to the box 10. When an animal walks upon the cleats 25 of the endless belt of the treadmill, the belt will be driven at a speed proportionate to the weight of the animal or animals walking upon it. The shaft 46 will thus be rotated at a speed proportionate to the weight of the animal on the treadmill through the intermediacy of the chain belts 17, sprocket wheels 22, shaft 23, gear wheels 42 and 43, shaft 15, worm wheel 14 and worm 45. Rotation of the shaft 46 will effect rotation of the governor arms 55, thereby causing the balls 56 and arms 55 to swing outwardly so as to raise the friction disk 50, thereby swinging upward the lever 60. The upward movement of the lever 60 will move the block 8 in the slot 7 toward the pivot 6 of the bell crank lever 5, through the intermediacy of the rod 61 and box 10, thereby lengthening the stroke of said bell crank lever and of the plunger 3 of the pump 2. The length of stroke will be proportionate to the weight of the animal on the treadmill, so that the amount of water pumped will also be proportionate to the weight of the animal doing the pumping. In case the increased work placed on the pump by the sliding of the block 8 toward the pivot 6 does not hold the speed of the treadmill below a predetermined rate, the disk 50 will be brought against the disk portion 49, thereby effecting a governing action which will prevent the speed of movement passing above a predetermined rate. By adjusting the box 48 vertically this maximum rate may be changed as desired.

In the operation of my invention, when one or more animals walk upon the cleats 25 of the treadmill, the mill will be set in operation, thereby operating the pump so as to discharge water into the trough 26. At the same time the chain belts 17 will be deflected so as to swing the angle bars 33 and 34 downward, thus, as already described, swinging the lever 35 so as to permit the valve 30 to drop by gravity into the upper end of the conductor 28. After the animal has moved off the treadmill, the weights 39 will swing the levers 35 and 36 in the opposite direction, and the lever 35 will lift the valve 30 to the open position, thereby permitting the water remaining in the trough 26 to run out through the conductor 28 into the lower trough 29. The lower trough may be employed to water hogs.

Secured to the frame 1 at the lower end of the endless belt of the treadmill is a horizontal timber 62, provided in its upper surface with a longitudinal groove 63 to catch the foot of the animal on the treadmill when the foot slips off. This timber preferably has the groove 63 sharply inclined on the side adjacent to the mill, so that the animal's foot will readily slip into the groove 63 and not be caught between the timber 62 and the cleats 25.

In the modified form shown in Fig. 8 for the worm wheel 14 is substituted a bevel gear wheel 64 which meshes with a bevel gear wheel 65 secured on the shaft 46. On the shaft 15 is secured a crank 66 to which is pivoted the lower end of the rod 4. The opening in the bottom of the trough 26 is omitted as of course is the valve mechanism which controls the said opening in the preferred form of my invetion hereinbefore described.

The operation and construction of the treadmill are the same as in the preferred form of my invention. When the animal passes upon the cleats 25 of the treadmill, the shaft 15 is rotated by the same mechanism described with reference to the preferred form of my invention. The shaft 46 will be rotated by means of the gear wheels 64 and 65, thereby swinging upward the governor arms 55 and disk 50, so that disk 50 will bear against the disk portion 49 and control the speed of movement of the treadmill. At the same time the plunger 3 will be reciprocated by means of the rod 4 and crank 66. To prevent the trough 26 from overflowing it may be provided with a discharge pipe 67, the upper end of which connects with the trough near the top thereof, and the lower end of which discharges into the trough 29.

I do not limit my invention to the specific constructions shown and described, as various modifications of my invention, within the scope of the appended claims, may be made without departing from its spirit.

Having thus described my invention, what I claim and desire to secure by Letters Patent, is:—

1. In a pumping machine, the combination with a water trough having a discharge opening, of a valve controlling said opening, a pump for discharging water into the trough, a treadmill, means actuated by the treadmill for operating the pump, and treadmill actuated connections for controlling the operation of said valve.

2. In a pumping machine, the combination with a water trough, of a pump for discharging water into the trough, a treadmill, means operative by the treadmill for operating the pump, and a treadmill actuated governor controlling the pump operating means.

3. In a pumping machine, the combination with a water trough having a discharge opening, of a valve controlling said opening, a pump for discharging water into the trough, a treadmill, means actuated by the treadmill for operating the pump, treadmill actuated means for controlling the operation of said valve, and a treadmill actuated governor controlling the pump operating means.

4. In a pumping machine, the combination with a pump having a reciprocating plunger, of a treadmill operative by the weight of an animal, means actuated by the treadmill for reciprocating said plunger, a plunger stroke adjuster, a treadmill actuated governor, and operating connections between the governor and stroke adjuster.

5. In a pumping machine, the combination with a water trough having a discharge opening, of a valve controlling said opening, a lever which when moved in one direction opens said valve, means for moving said lever in said direction, a treadmill, and means actuated by the treadmill for moving said valve operating lever in the opposite direction.

6. In a pumping machine, the combination with a treadmill, of a water trough having a discharge opening, a valve movable automatically to a position closing said opening, a lever which swung in one direction moves said valve to the open position, means for swinging said lever in said direction, means by which the treadmill when supporting the weight of an animal swings the lever in the other direction, a pump, and means actuated by the treadmill for operating the pump.

7. In a pumping machine, the combination with a pump having a reciprocative plunger, a treadmill, a pivoted lever having a slot disposed radially relative to the pivot of the lever, a block slidable in said slot for swinging said lever, means connected with said lever for reciprocating said plunger, means actuated by the treadmill for oscillating said block, a treadmill actuated governor, and operating connections between the governor and block for moving said block in said slot toward the pivot of the lever as the speed of the treadmill increases, thereby changing the length of stroke of the lever and the pump plunger.

In testimony whereof I have signed my name to this specification in presence of two subscribing witnesses.

WILLIAM M. MYERS.

Witnesses:
 WARREN D. HOUSE,
 HENRY F. ROSE.